United States Patent
Lamprell

(10) Patent No.: US 9,343,218 B2
(45) Date of Patent: May 17, 2016

(54) ELECTROMAGNETIC ACTUATORS AND MONITORING THEREOF

(75) Inventor: Ian Lamprell, Cambridgeshire (GB)

(73) Assignee: Camcon Oil Limited, Cambridge, Cambridgeshire (GB)

( * ) Notice: Subject to any disclaimer, the term of this patent is extended or adjusted under 35 U.S.C. 154(b) by 53 days.

(21) Appl. No.: 14/125,709

(22) PCT Filed: Jun. 21, 2012

(86) PCT No.: PCT/GB2012/051438
§ 371 (c)(1),
(2), (4) Date: Dec. 12, 2013

(87) PCT Pub. No.: WO2012/175968
PCT Pub. Date: Dec. 27, 2012

(65) Prior Publication Data
US 2014/0117911 A1    May 1, 2014

(30) Foreign Application Priority Data

Jun. 24, 2011 (GB) .................................. 1110699.4
Jan. 31, 2012 (GB) .................................. 1201623.4

(51) Int. Cl.
G01R 31/02 (2006.01)
H01F 7/18 (2006.01)
G01D 5/22 (2006.01)

(52) U.S. Cl.
CPC ............ *H01F 7/1844* (2013.01); *G01D 5/2241* (2013.01); *H01F 2007/185* (2013.01); *H01F 2007/1861* (2013.01)

(58) Field of Classification Search
CPC ..................... H02K 41/031; H01F 2007/1684; H01F 2007/185; H01H 9/547
See application file for complete search history.

(56) References Cited

U.S. PATENT DOCUMENTS 3,789,876 A    2/1974    Kempton et al.
5,804,962 A    9/1998    Kather et al.
(Continued)

FOREIGN PATENT DOCUMENTS

CN    1225334 A    8/1999
CN    1596451 A    3/2005
(Continued)

OTHER PUBLICATIONS

European Patent Office, International Search Report and Written Opinion of the International Searching Authority, International Application No. PCT/GB2012/051438, mailed Dec. 6, 2012 (11 pages).
(Continued)

*Primary Examiner* — Karen Masih
(74) *Attorney, Agent, or Firm* — Wood, Herron & Evans, LLP

(57) ABSTRACT

An assembly includes an electromagnetic actuator (80) and a voltage response arrangement (26) to enable the position of the armature (1) within the actuator to be monitored. The actuator includes two coils (4) joined together in series, the armature being switchable between at least two magnetically latched stable rest positions by passing a current pulse through the coils, and an output contact (82) electrically coupled to the junction (24) between the coils to facilitate monitoring of the voltage at the junction. The voltage response arrangement (26) is electrically coupled to the output contact (82) so as to provide an output signal giving an indication of the position of the armature (1) in response to the voltage generated on the output contact when a current pulse is passed through the coils (4). A method of monitoring the armature position is also provided.

18 Claims, 3 Drawing Sheets

(56) References Cited

U.S. PATENT DOCUMENTS

| | | | |
|---|---|---|---|
| 6,037,739 | A | 3/2000 | Hartramph et al. |
| 6,275,368 | B1 | 8/2001 | Yamada et al. |
| 7,898,121 | B2 * | 3/2011 | Ramsay et al. ............ 310/14 |
| 2003/0098686 | A1 | 5/2003 | Mednikov et al. |
| 2004/0016461 | A1 | 1/2004 | Qu et al. |
| 2007/0242408 | A1 | 10/2007 | Bergstrom et al. |
| 2008/0191826 | A1 | 8/2008 | Keller et al. |
| 2008/0284418 | A1 | 11/2008 | Lueck |
| 2009/0027823 | A1 | 1/2009 | Follic et al. |
| 2010/0201375 | A1 * | 8/2010 | Walker ..................... 324/546 |

FOREIGN PATENT DOCUMENTS

| | | |
|---|---|---|
| CN | 101164125 A | 4/2008 |
| CN | 101354944 A | 1/2009 |
| DE | 31 50 814 A1 | 6/1983 |
| DE | 103 08 057 A1 | 9/2004 |
| WO | 2010/067110 A1 | 6/2010 |

OTHER PUBLICATIONS

European Patent Office, Written Opinion of the International Preliminary Examining Authority, International Application No. PCT/GB2012/051438, mailed Jul. 1, 2013 (6 pages).

European Patent Office, International Preliminary Report on Patentability, International Application No. PCT/GB2012/051438, mailed Oct. 4, 2013 (21 pages).

Espacenet, English Machine Translation of DE3150814A1, published Jun. 30, 1983, retrieved from http://worldwide.espacenet.com on Dec. 19, 2014 (8 pages).

Espacenet, English Machine Translation of DE10308057A1, published Sep. 9, 2004, retrieved from http://worldwide.espacenet.com on Dec. 19, 2014 (9 pages).

United Kingdom Intellectual Property Office, Application No. GB1201623.4, dated Sep. 20, 2012 (1 page).

Espacenet, English Machine Translation of CN1225344A, published Aug. 11, 1999, retrieved from http://worldwide.espacenet.com on Jul. 13, 2015 (15 pages).

Espacenet, English Machine Translation of Abstract of CN1596451A, published Mar. 16, 2005, retrieved from http://worldwide.espacenet.com on Jul. 13, 2015 (2 pages).

Espacenet, English Machine Translation of CN101164125A, published Apr. 16, 2008, retrieved from http://worldwide.espacenet.com on Jul. 13, 2015 (10 pages).

Espacenet, English Machine Translation of CN101354944A, published Jan. 28, 2009, retrieved from http://worldwide.espacenet.com on Jul. 13, 2015 (13 pages).

Chinese Patent Office, Translation of Search Report, Chinese Application No. 201280025534.9, dated May 27, 2015 (2 pages).

* cited by examiner

US 9,343,218 B2

ELECTROMAGNETIC ACTUATORS AND MONITORING THEREOF

FIELD OF THE INVENTION

The present invention relates to electromagnetic actuators and in particular to the monitoring of the position of the armature within such an actuator.

BACKGROUND TO THE INVENTION

It is desirable to monitor the position of the armature within an electro-mechanical linear actuator to check that the device has either responded correctly to a command signal or that it has not been forced to an incorrect state by an external influence.

It is known to use a Hall effect magnetic sensor to monitor the armature position. This sensing technology can be compact and have a long lifetime whilst withstanding high operating temperatures.

However, a number of problems have been encountered with the use of Hall effect devices and other position sensors. As the sensor needs to be mounted on the actuator, this requires additional electrical wiring and connections between the actuator, sensor and control board. This increases the risk of equipment failure. In some applications, there may be insufficient physical space available to accommodate a position monitoring sensor. Furthermore, provision of a sensor may require an additional aperture in the actuator housing. This may make it more difficult to seal the actuator against ingress of fluids, particularly in high pressure environments.

Another potential problem is that the configurations of sensors can vary significantly and selection of a different sensor may require significant changes to the actuator configuration to accommodate it. A further drawback with Hall effect sensors is that they draw a significant amount of power. Thus it is preferable, particularly when relying on a local battery, to switch off the sensor when it is not in use, increasing the complexity of the control system. In addition, Hall effect sensors are not able to operate in very high temperature environments.

SUMMARY OF THE INVENTION

The present invention provides an assembly including an actuator, wherein the actuator includes:
an armature comprising a permanent magnet;
two coils joined together in series, the armature being switchable between at least two magnetically latched stable rest positions by passing a current pulse through the coils; and
an output contact electrically coupled to the junction between the coils to facilitate monitoring of the voltage at the junction,
and wherein the assembly includes a voltage response arrangement electrically coupled to the output contact so as to provide an output signal giving an indication of the position of the armature in response to the voltage generated on the output contact when a current pulse is passed through the coils.

Monitoring of the armature position via this output contact enables monitoring to be achieved with fewer electrical connections to the actuator and a smaller component count, relative to use of a Hall effect sensor. This improves the reliability of the actuator. As a dedicated sensor is not required, this approach is particularly beneficial in space-critical applications. Also, removing the need for an additional position sensor reduces the dependency on the suitability and availability of a specific component.

The actuator may be monitored either during a test pulse or during an actuation pulse for diagnostic purposes.

An assembly of the invention may include an indicator arrangement configured to receive the output signal and provide an indication to a user dependent on the output signal.

The indication may be selected from: a fault indication; an indication of the armature position; a value dependent on a measured voltage; a value corresponding to a peak measured voltage; and a plot of measured voltage against time.

In a preferred embodiment an output potential divider is electrically coupled to the output contact, wherein the voltage response arrangement is coupled to the output of the output potential divider. This may be included to reduce the measured voltage to a level compatible with the voltage response arrangement.

A supply potential divider may be electrically coupled across the switching voltage supply lines for the actuator, wherein the voltage response arrangement is coupled to the output of the supply potential divider, which output provides a reference voltage for the voltage response arrangement. In this way, the operation of the voltage response arrangement can be made substantially independent of variations in the supply voltage. Also, this approach has been found to be substantially independent of temperature, at least over the range 26-175° C. Preferably, the ratio of the supply potential divider is substantially the same as that of the output potential divider.

The present invention further provides a method of monitoring the position of an armature in an actuator, the actuator having two coils joined together in series, with the armature comprising a permanent magnet and being switchable between at least two magnetically latched stable rest positions by passing a current pulse through the coils, the method comprising the steps of:
passing a current pulse through the coils;
monitoring the voltage at the junction between the coils during the current pulse with a voltage response arrangement; and
generating an output signal with the voltage response arrangement which gives an indication related to the position of the armature.

The current pulse applied to the coils during a monitoring operation may be of shorter generation than the pulse duration required to switch the actuator from one stable rest position to another. For example, it may last for a matter of micro-seconds rather than milli-seconds. The voltage generated at the junction between the coils will therefore be predominantly dependent on the relative inductances of the coils. The pulse may be a single, discrete pulse of direct current.

Alternatively, the monitoring arrangement may be sensitive to the voltage generated during the rapidly changing current at the start or end of a pulse used to switch the actuator from one stable rest position to another, or to the voltage generated throughout all or a portion of a switching pulse.

Only one voltage may need to be monitored to determine the position information, namely the voltage at the junction between the coils. The indication generated by the voltage response arrangement may be related to a comparison between the measured voltage response (preferably the peak voltage value attained during the response) and at least one reference voltage.

In a preferred embodiment, the monitoring step comprises comparing the voltage at the junction between the coils with a threshold value to determine the armature position. More particularly, it may determine which stable rest position the armature is in, and the output signal generated in the generating step indicates the determined stable rest position.

In a further embodiment, the monitoring step may comprise comparing the voltage at the junction with two threshold values to determine which stable rest position the armature is in and whether the armature was switched electrically into that position, and the output signal generated in the generating step is also responsive to whether the armature was switched electrically into the determined stable rest position.

More particularly, it has been realised that, where the actuator housing is made of a material having a sufficient magnetic remanence, it is possible to determine from the response at the junction between the coils whether the armature was switched into its current rest position by electrically energising the coils, or by some other means.

BRIEF DESCRIPTION OF THE DRAWINGS

A known configuration and embodiments of the invention will now be described by way of example and with reference to the accompanying schematic drawings, wherein.

DETAILED DESCRIPTION

Figure 1:
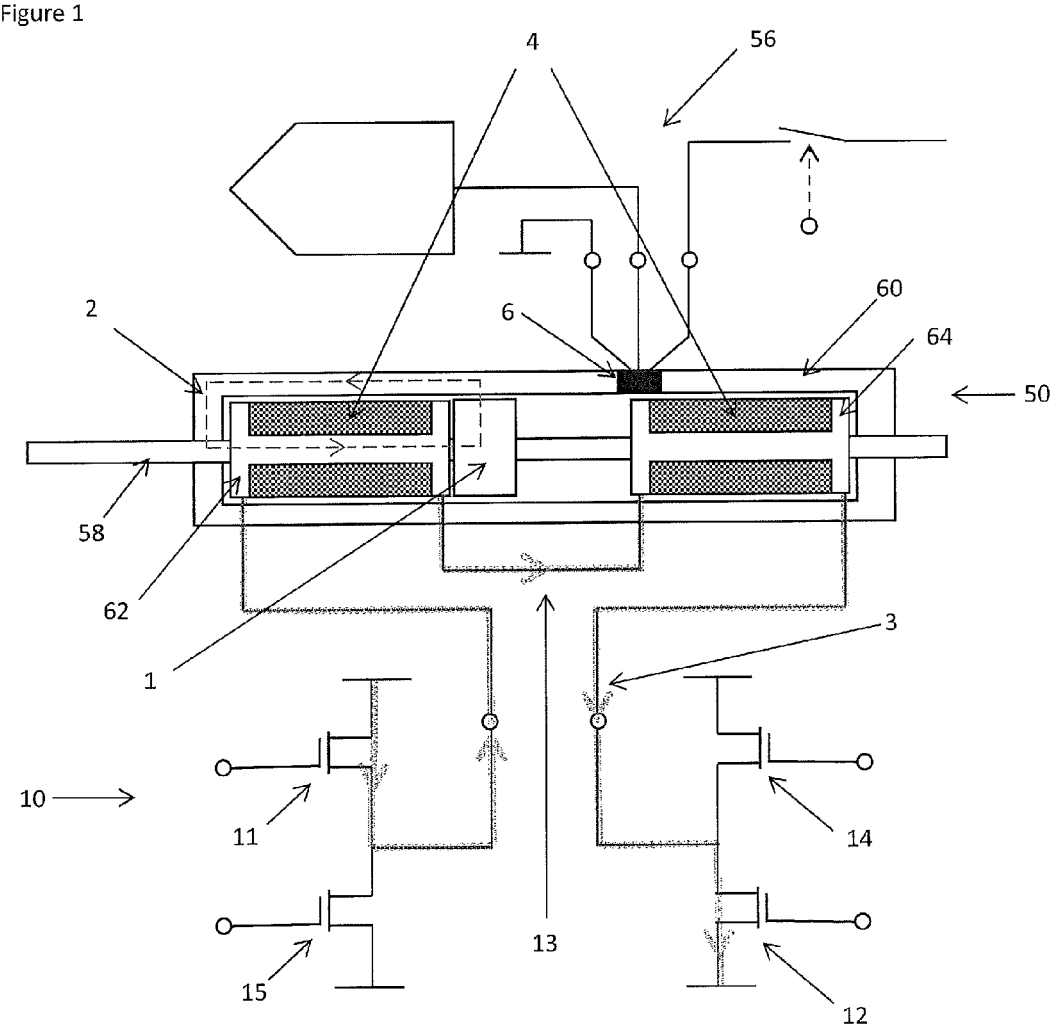
FIGS. 1 and 2 show circuit diagrams of an assembly including a known actuator having a Hall effect position sensor and the associated driving and sensing circuitry, with the current flow during switching of the armature from one position to another and vice-versa shown in respective Figures.
Figure 2:
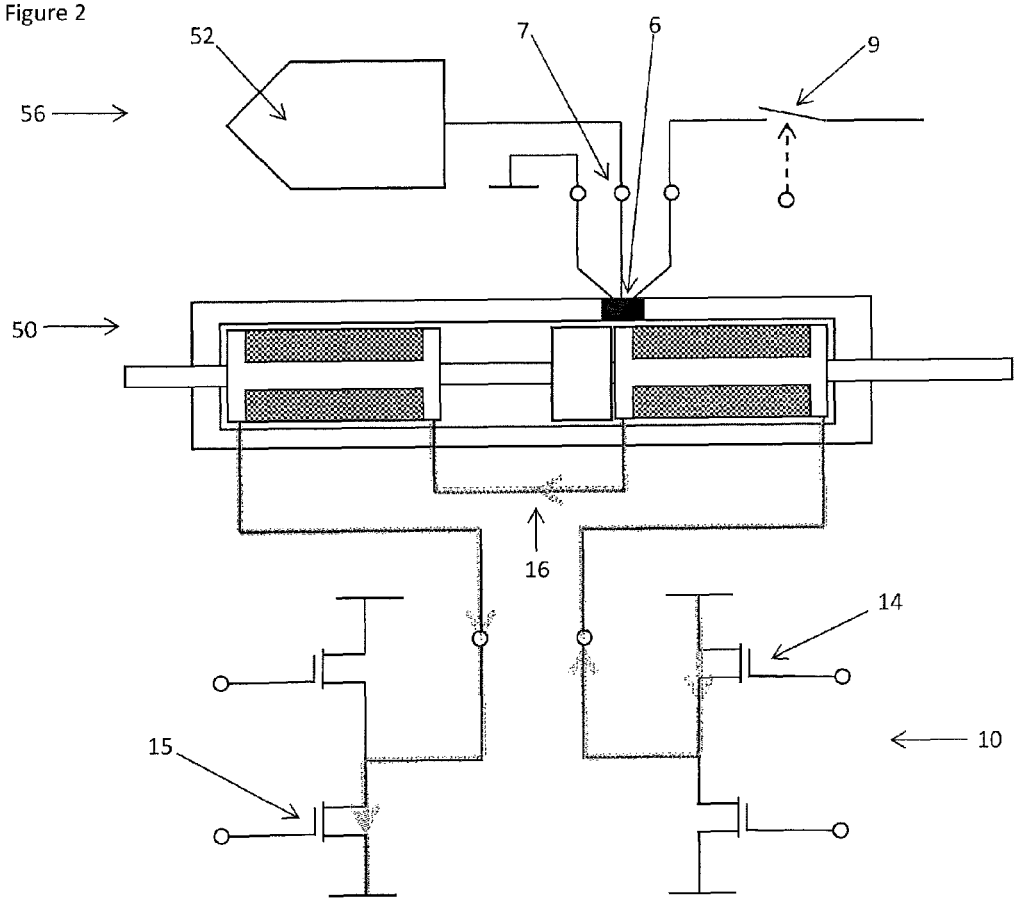

A side cross-sectional view of a known electro-mechanical magnetically latched linear actuator 50 is shown in FIGS. 1 and 2. The driving circuitry 10 for switching the actuator from one magnetically latched stable position to another is also shown, along with a Hall effect position sensor 6 and the accompanying monitoring circuitry 56.

The actuator includes an armature 1 comprising a permanent magnet. The armature is mounted on a push rod 58, which extends beyond the ends of an elongate cylindrical housing 60.

A pair of coils 4 is provided coaxially with the push rod on either side of the armature 1 along its direction of reciprocal movement.

An actuator of this form is described for example in the present applicant's patent application WO2010/067110, the contents of which are incorporated herein by reference.

The actuator of FIGS. 1 and 2 has two stable states corresponding to each end of its travel. Similar actuators may be configured to have more than two stable states and the present invention is also applicable to those configurations. Each stable state of the actuator of FIG. 1 is maintained by the magnet of the armature 1, which completes a magnetic circuit 2 via a coil core 62 or 64 and the housing 60 in either state.

Transition of the armature from one stable state to another is initiated by a pulse of electrical current flowing through the pair of coils 4. The current flowing in these coils creates an electromagnetic force which causes the armature to move. The path 13 of such a current pulse is highlighted in FIG. 1, and the reverse direction of current flow 16 is illustrated in FIG. 2.

The coils 4 are connected in series, but in antiphase. The result is that when a current pulse is applied, one coil will repel the armature from its initial stable rest position and the other will attract the armature to the other rest position. To return the armature to the previous stable state, the current pulse is applied through the coils in the opposite direction, so as to overcome the present polarity of the magnetic circuit. A coil that previously repelled the armature will now attract and vice-versa for the other coil.

The actuating coils 4 are driven by an H-bridge transistor driving circuitry 10. To drive the armature to the "set" position, the upper left-hand transistor 11 and lower right-hand transistor 12 are briefly switched on. Current will then flow from left-to-right in FIG. 1 in direction 13 through the coils. To return the armature to the "reset" position, the upper right-hand transistor 14 and lower left-hand transistor 15 are switched on so the current flows from right-to-left through the coils (direction 16 in FIG. 2).

As indicated in FIG. 2, the additional sensing circuitry associated with Hall effect sensor 6 comprises an on-off switch 9, output connections and wiring 7, and a measurement circuit 52.

Figure 3:
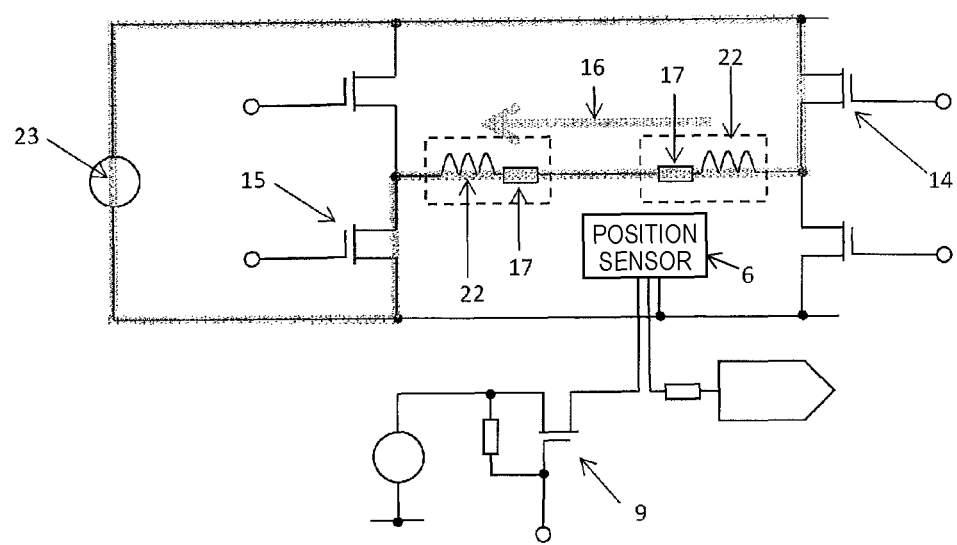
FIG. 3 shows a similar circuit diagram to that of FIG. 2, with the actuator coils represented by their impedances.

An alternative representation of the circuitry of FIG. 2 is shown in FIG. 3. In FIG. 3, the coils 4 are each represented by a corresponding resistive impedance 17 and inductive impedance 22.

Figure 4:
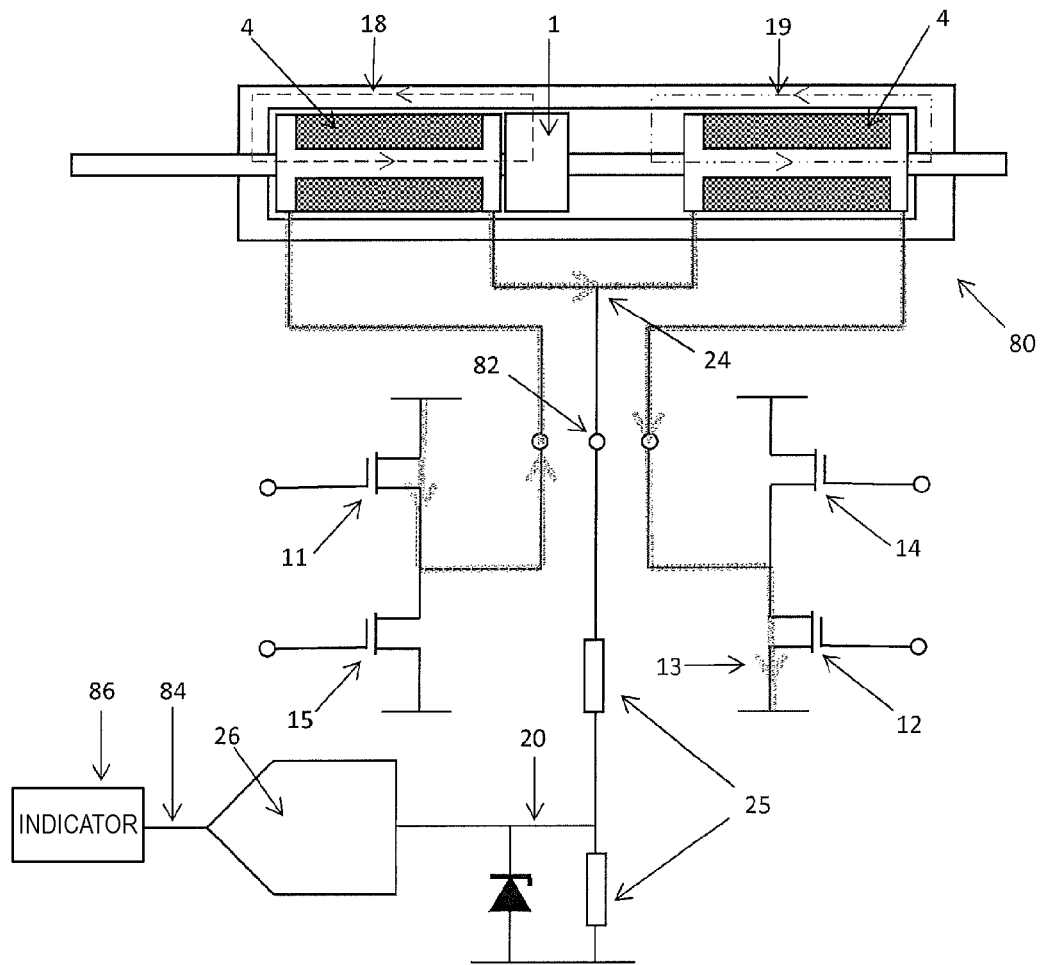
FIG. 4 is a circuit diagram of an assembly comprising an actuator with driving and position monitoring circuitry according to an embodiment of the invention.
Figure 5:
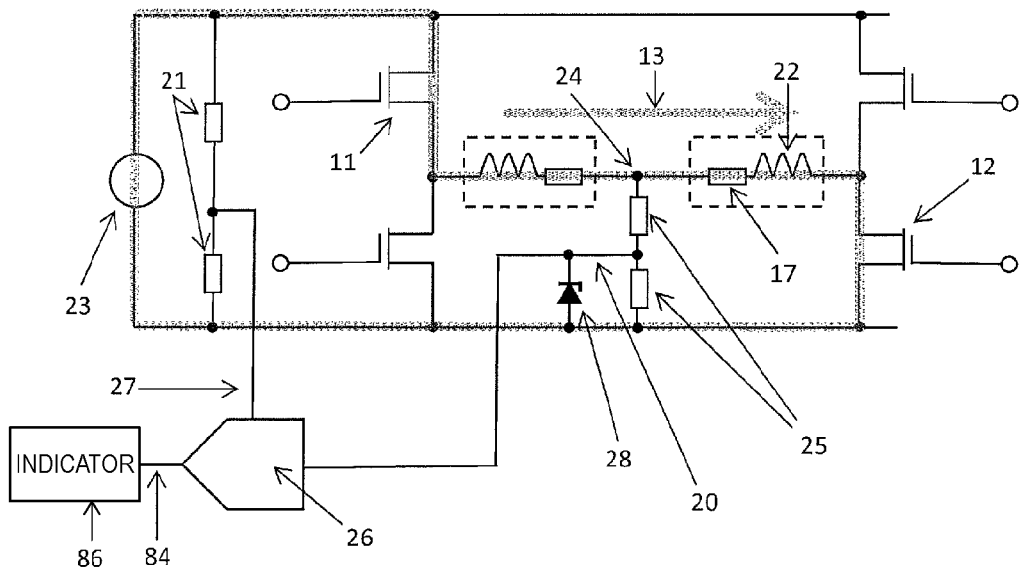
FIG. 5 shows a similar circuit diagram to that of FIG. 4, with the actuator coils represented by their impedances.

An assembly embodying the present invention is depicted in FIGS. 4 and 5. It overcomes the limitations of using a Hall effect sensor and those of other approaches using separate sensing means, by monitoring the electrical characteristics of the actuator coils using a combination of its driver circuitry and additional monitoring circuitry.

The actuator 80 of FIG. 4 differs from that shown in FIGS. 1 and 2 in that it includes an additional electrical output contact 82 which is coupled to the junction 24 between the two coils 4. The inventor has realised that the position of the armature 1 may be monitored via this connection due to the different reluctance of the magnetic circuits associated with each coil depending on which stable rest position is occupied by the armature. As indicated in FIG. 4, the reluctance of the closed magnetic circuit 18 which includes the armature 1 is significantly different to that of the open magnetic circuit 19, which does not. As the inductance of the coils is dependent on the reluctance of their associated magnetic fields, this difference can be measured.

During normal actuator switching operations, the coils are energised for long enough for the armature to change position. During this time, the predominant element of the coil impedance is resistance 17 and this limits the current that will flow in the coil. At these low frequencies, the inductive element of the coil impedance will be small and therefore difficult to measure. Inductive impedance is frequency dependent. At DC or low frequency, the impedance will be low, while it will be high at high frequency or during sudden changes of voltage.

If a fast, on-state current pulse (of relatively short duration compared to a normal actuation pulse) is applied to the coils, the inductive impedance 22 is significant for the duration of the pulse, and the current flow through the coils rises comparatively slowly. The resistive elements 17 of the coils have a negligible effect, as do the losses in the H-bridge transistors 11, 12, 14 and 15. During the pulse, the coils are connected in series across the power supply 23. They therefore act as a potential divider, with the voltage present at the junction 24 of the coils and at contact 82 related to the supply voltage and the ratio of the coil inductive impedances.

In FIGS. 4 and 5, a current pulse 13 is shown as flowing from the upper left-hand side transistor 11, via the coils 4, and to ground via the lower right-hand side transistor 12.

The voltage at the junction 24 of the two coils 4 may be monitored directly using a voltage response arrangement. Alternatively, it may be supplied to a voltage response arrangement such as measuring circuitry 26 via an additional potential divider 25. This is of sufficiently high impedance to drop the voltage at the output 20 of the potential divider to a level suitable for the measuring circuitry.

The voltage response arrangement may generate an output signal dependent on a comparison of its input voltage with a reference voltage, or some other relative measure, for example. In other implementations, its output signal may relate to the absolute value of the voltage at its input.

The output 84 of the measuring circuitry 26 is communicatively coupled to an indicator arrangement 86. This is operable to provide an indication to a user dependent on the signal received from output 84. The indicator arrangement may be a dedicated device, or form part of a general user interface associated with the assembly including the actuator, for example.

In a preferred embodiment, the voltage received by the measuring circuitry 26 is inputted into an analogue to digital converter (ADC). The resulting digital signal is compared with preset limits corresponding to respective stable positions of the armature. A signal is then fed to output 84 which is dependent on the result of this comparison. The status of the actuator is then communicated to the user in response to this signal by indicator arrangement 86. The information presented to the user may indicate that the actuator is operating correctly, identify the stable position occupied by the armature, and/or alert the user to abnormal operation. This indication may be given using a display device or other indicators such as LEDs for example. In some implementations, the digital value outputted by the ADC may be transmitted to indicator arrangement 86 for storage and/or display.

The values selected for the resistors of the potential divider 25 may be selected such that the maximum measurable voltage is achieved when the monitored voltage is at the full supply voltage. In this way, if the impedances of both coils are equal, then the measured voltage will be half the maximum supply voltage. This halfway point may be used as a threshold for determining the position of the armature. When monitoring the armature position, the measured voltage will either be above or below this midway point, dependent on the position of the armature. The extent to which it is above or below will depend on the coil impedances in the set and reset positions.

A further modification is illustrated in FIG. 5. A supply potential divider 21 is connected across the supply 23. The output 27 from this potential divider is coupled to the measuring circuit 26 to provide a reference voltage. The output signal from the measuring circuit may then be generated so as to be dependent on the ratio of the coil impedances alone and variations in the supply voltage will have little or no effect on the measured signal. Preferably, the supply voltage is divided by the potential divider 21 in the same ratio as that used in divider 25.

In one implementation, the impedance of each coil was found to be 5 mH with the armature in 1 (closed circuit) position, and 13 mH in the other (open position). With the difference between the two impedances greater than 2:1, the armature position may be readily determined and the monitoring is not materially affected by environmental changes.

In this same implementation, a suitable duration for an actuation pulse was 5 to 20 ms, and 10 to 20 us was a suitable pulse duration for an armature position monitoring operation.

The present technique may be used to give an indication of the actual position of the armature along its range of travel. If the armature does not arrive at its fully home position (where the magnetic force is strongest), then the impedance of the adjacent coil will be different from that at the fully home position. This impedance variation and the associated change in the voltage measured at contact 82 during a monitoring operation may be used to determine the position of the armature. In this way, the actuator can be monitored to check that the armature always reaches its fully home position. Monitoring over a longer term can be used to determine when maintenance is appropriate, for example if small changes in position develop over time.

It will be appreciated that the measurement procedure may be repeated in each stable rest position to confirm that it is correctly detected.

This monitoring approach may be used to test for faults, such as open or short circuit coils. If the coil connected to ground is open circuited, the measured voltage will be at a maximum, whilst if the coil is short circuited, the measured voltage will be near zero, assuming that the other coil is operating normally.

Regular voltage readings may be taken with the present measuring circuit during an actuation (actuator switching) pulse to provide a plot of voltage against a time. This may then be compared with reference waveforms to detect abnormal behaviour, such as a slow or sticking actuator mechanism. Such measurements could be highly beneficial in applications where access to the actuator is difficult by providing information regarding performance of the actuator for maintenance scheduling purposes.

The voltage reading at the start of an actuation pulse may be used to determine the position of the armature. At this stage, the impedance of the coils will be largely inductive and so the measured voltage will be indicative of the armature position. In order to check the position of the armature after it has been switched, it will be necessary to apply a short measurement pulse after the actuation pulse. This is because the voltage measured at the end of the actuation pulse will be dictated by the resistive impedance of the coils and so will not be sufficiently dependent on the armature position.

The monitoring circuitry may be configured to function at a lower supply voltage than that used to operate the actuator by adjusting the values of the resistors in the potential divider 25 accordingly. A Zener diode 28 to may be included to protect the measuring circuit from the higher supply voltage used during a switching operation. As shown in FIG. 5, Zener diode 28 is provided with its anode connected to the lower supply rail and its cathode connected to the potential divider output 20.

As shown in FIG. 4, the armature position monitoring may be carried out using pulses generated by the driving circuitry associated with the actuator. It may be implemented using readily available low cost components suited for use in high temperature environments. The technique may generate strong signals, that may not require individual devices to be calibrated or necessitate temperature compensation.

If the actuator housing is made of a material having a sufficient magnetic remanence, it is possible to determine from the response at the junction between the coils whether the armature was switched into its current rest position by electrically energising the coils, or by some other means.

An example of a housing material with sufficient magnetic remanence is hardened steel. This material may be selected for use in high pressure environments such as regions deep underground. For example, the actuator may be deployed in an oil well.

Where the actuator housing material has a significant magnetic remanence, some residual magnetic flux remains in the magnetic circuits of the actuator after it has been switched by electrically energising the coil. This affects the inductance connected on each side of the output contact and therefore the voltage present on the output contact during a measurement operation. As the magnetic circuits 18 and 19 associated with each coil will be different depending on whether they include the armature or not, this affects the magnitude of the residual magnetic flux in the housing at each end of the actuator.

In some circumstances, the actuator may be switched without the coils having been energised. This may be intentional or could perhaps occur inadvertently. For example, a pressure differential across the actuator (or a valve or other structure coupled to the actuator) may be changed intentionally or accidentally to such an extent as to switch the actuator from one stable rest position to another. By monitoring the voltage response at the output contact of the actuator, it may be possible to diagnose whether switching was caused by magnetic forces exerted on the armature by the coils, or other means, such as external mechanical forces.

The voltage response to a current pulse at the output contact may be compared with threshold values to determine an indication of how the actuator was switched.

For example, switching of the actuator will now be considered with reference to FIG. 4. In FIG. 4, current pulse 13 travels from left to right through the actuator. The voltage at junction 24 was measured during a 10 us pulse in the direction of pulse 13. The voltage was measured with the armature in its left-hand and then its right-hand stable rest positions, after switching the actuator electrically by energising the coils, and by mechanically forcing it to switch. The voltage at point 20 as a percentage of the reference voltage at point 27 (see FIG. 5) in each scenario was as follows:

| Armature status | Output voltage percentage |
|---|---|
| Left-hand position, mechanically switched | 91 |
| Left-hand position, electrically switched | 88 |
| Right-hand position, electrically switched | 45 |
| Right-hand position, mechanically switched | 24 |

Accordingly, setting comparison thresholds within the measuring software of the voltage response arrangement of say 89.5 percent, 67 percent and 35 percent enables differentiation between the four scenarios.

It will be appreciated that a similar procedure could be carried out by passing a current pulse in the opposite direction, from right to left through the actuator. Indeed, the greater difference between electrical and mechanical switching into the right-hand position compared to the left-hand position in the above table could be attained in relation to the left-hand position by passing the current pulse from right to left, making a greater distinction between the two methods of switching into the left-hand position.

The invention claimed is:

1. An assembly including an actuator, wherein the actuator comprises:
    an armature;
    two coils joined together in series; and
    an output contact electrically coupled to the junction between the coils to facilitate monitoring of the voltage at the junction,
    and wherein the assembly includes a voltage response arrangement,
    wherein
    the armature comprises a permanent magnet;
    the armature is switchable between at least two magnetically latched stable rest positions by passing a current pulse through the coils; and
    the voltage response arrangement is electrically coupled to the output contact so as to provide an output signal giving an indication of the position of the armature derived from the voltage generated on the output contact when a current pulse is passed through the coils.

2. The assembly of claim 1 including an indicator arrangement configured to receive the output signal and provide an indication to a user dependent on the output signal.

3. The assembly of claim 2 wherein the indication is selected from:
    a fault indication;
    an indication of the armature position;
    a value dependent on a measured voltage;
    a value corresponding to a peak measured voltage; and
    a plot of measured voltage against time.

4. The assembly of claim 2, including an output potential divider electrically coupled to the output contact, wherein the voltage response arrangement is coupled to the output of the output potential divider.

5. The assembly of claim 2, wherein the voltage response arrangement comprises comparison circuitry for comparing the voltage on the output contact with at least one threshold and generating an output signal which is dependent on the comparison.

6. The assembly of claim 2, wherein a voltage protection arrangement is provided to protect the voltage response arrangement from applied voltages above a predetermined threshold.

7. The assembly of claim 4, wherein a voltage protection arrangement is provided to protect the voltage response arrangement from applied voltages above a predetermined threshold.

8. The assembly of claim 2, including a supply potential divider electrically coupled across the switching voltage supply lines for the actuator, wherein the voltage response arrangement is coupled to the output of the supply potential divider, which output provides a reference voltage for the voltage response arrangement.

9. A method of monitoring the position of an armature in an actuator, the actuator having two coils (4) joined together in series,
    wherein
    the armature comprises a permanent magnet and is switchable between at least two magnetically latched stable rest positions by passing a current pulse through the coils, and the method comprises the steps of:
    passing a current pulse through the coils;
    monitoring the voltage at the junction between the coils during the current pulse with a voltage response arrangement; and
    generating an output signal with the voltage response arrangement which gives an indication related to the position of the armature, and is derived from the voltage at the junction.

10. The method of claim 9, wherein the indication is selected from:
    a fault indication;
    an indication of the armature position;
    a value dependent on a measured voltage;
    a value corresponding to a peak measured voltage; and
    a plot of measured voltage against time.

11. The method of claim 9, wherein the pulse in the current pulse passing step is of shorter duration than the pulse duration required to switch the actuator from one stable rest position to another.

12. The method of claim 11, wherein the pulse is generated using circuitry provided to switch the actuator.

13. The method of claim 9, wherein the pulse in the current pulse passing step switches the actuator from one stable rest position to another.

14. The method of claim 9, wherein the indication relates to a comparison between a measured voltage response and at least one reference voltage.

15. The method of claim 9, wherein the monitoring step comprises comparing the voltage at the junction with a threshold value to determine the armature position.

16. The method of claim 15, wherein the monitoring step comprises comparing the voltage at the junction with a threshold value to determine which stable rest position the armature is in, and the output signal generated in the generating step indicates the determined stable rest position.

17. The method of claim 9, wherein the monitoring step comprises comparing the voltage at the junction with two threshold values to determine which stable rest position the armature is in and whether the armature was switched electrically into that position, and the output signal generated in the generating step is also responsive to whether the armature was switched electrically into the determined stable rest position.

18. The assembly of claim 7, wherein the voltage protection arrangement comprises a Zener diode electrically coupled between the output of the output potential divider and the low voltage side of the output potential divider.

* * * * *